H. Baughman.
Honey Comb Frame.
N° 78,263. Patented May 26, 1868.

Witnesses:
H. L. Rice
G. B. Ogilvie

Inventor:
Henry Baughman

United States Patent Office.

HENRY BAUGHMAN, OF COLUMBUS, OHIO.

*Letters Patent No. 78,253, dated May 26, 1868.*

---

IMPROVEMENT IN BEE-HIVES.

---

The Schedule referred to in these Letters Patent and making part of the same.

---

TO ALL WHOM IT MAY CONCERN:

Be it known that I, HENRY BAUGHMAN, of the city of Columbus, county of Franklin, and State of Ohio, have invented a new and improved Bee-Hive; and do hereby declare that the following is a full and exact description thereof, reference being had to the accompanying drawings, and to the letters of reference thereon.

The letters $a$ are the air-chamber and false entrance.

The letters $b$ are the true entrance and covered way into the hive.

The letters $c$ are the comb-frames.

The letters $d$ are the wire-gauze covering to comb-frames.

The letters $e$ are the feeding-troughs.

The letters $f$ are the metal tubes for filling feeding-troughs.

Figure 1:
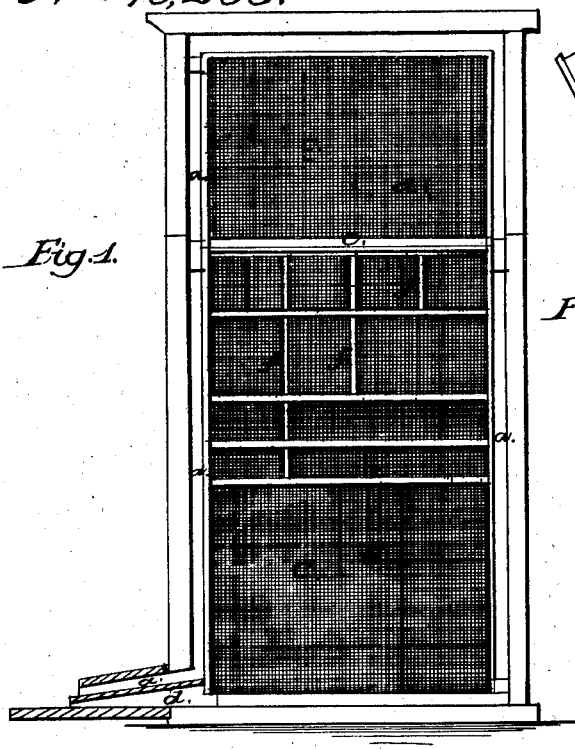
Figure 1 represents an enlarged right section of the hive, showing comb-frames and feeding-troughs.
Figure 2:
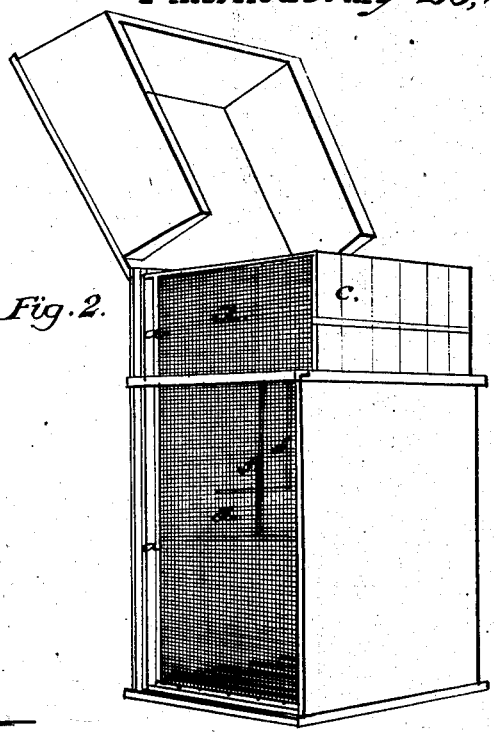
Figure 2 represents a perspective view of the hive, with the side removed and lid raised.
Figure 3:
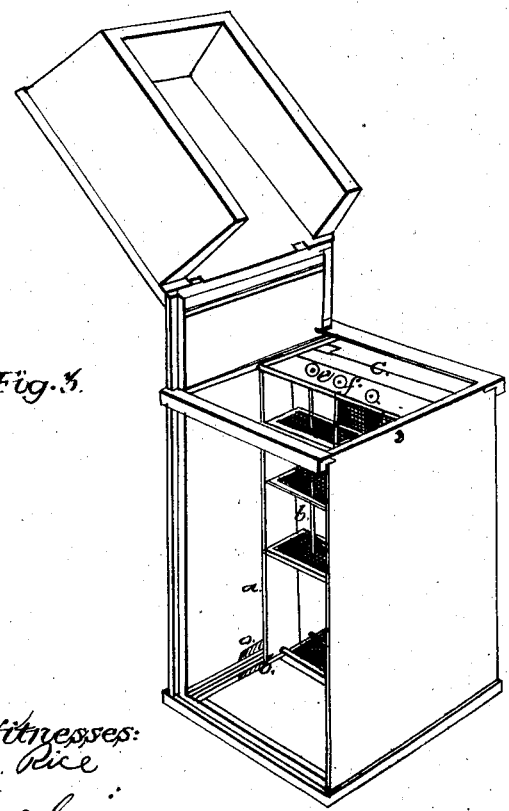
Figure 3 represents a perspective view of the interior of the hive.
Figure 4:
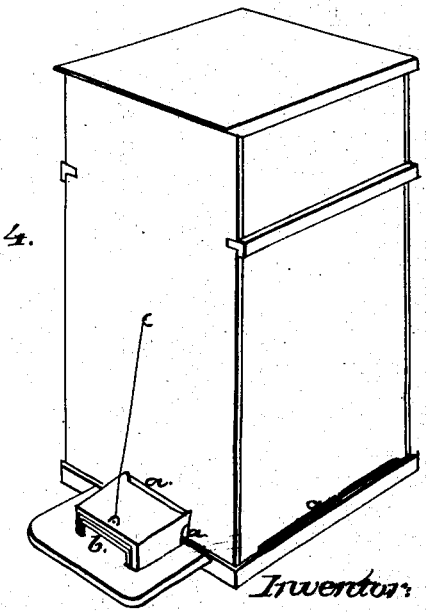
Figure 4 represents a perspective view of the hive when it is closed.

The nature of my invention is providing a bee-hive, of which fig. 4 is a perspective view, with a combination of upper and lower comb-frames, as represented by the letter $c$, figs. 1 and 2, furnishing honey-chambers inside the main hive, and leaving the honey-combs or comb-frames $c$ entirely surrounded by an air-chamber or open space, between the comb-frames and main hive, as shown at $a$, figs. 1, 2, and 3; also for providing bee-hives with a simple mode of ventilation, by means of the ventilation-holes, shown at $a$ in figs. 1, 3, and 4; also with a peculiar entrance, $b$, figs. 1, 3, and 4, for the bees, with a false entrance, $a$, as shown in figs. 1 and 4, surrounding the true entrance on three sides, as shown in fig. 4, and designed to deceive the miller, which infest the bees, as the miller will enter the first opening they find, hence they will be decoyed into the air-chamber, shown in $a$, figs 1, 2, and 3; surrounding the honey, the honey being enclosed in the comb-frames $c$, shown in figs. 1, 2, and 3, by a wire-gauze covering, shown by $d$ in figs. 1, 2, and 3, covering two of the sides of the comb-frames; as shown in figs. 1, 2, and 3, which secures both the honey and the bees from the ravages of the miller.

The comb-frames are intended to be held together by a strip, connecting the front and back of the hives, and cause the bees to build a comb straight from the top to the bottom.

In order to make my invention clearly understood, I will proceed to describe the full construction of it.

The front of the hive is made of one board, the full height and width of the hive. The back of the hive is made of one board, the full width and two-thirds the height of the hive. The back board is held to the front board by strips, framed across the width of the hive, at bottom and top. The sides are held at the top by a rebate in the strips, connecting the front and back of the hive. The lower ends of the sides are held in their place by screws, passing through the front and back of the hive into the sides of the lower end. The top of the hive is a square board, the size of the top of the hive, with three sides attached to it, corresponding to and forming that portion of the hive which projects above the cross-strips which connect the front and back of the hive.

The top board is fastened to the upper end of the front board by hinges, in such a manner as to enclose the top of the hive, yet easily opened when requisite. The sides are cut away at the bottom for the admission of air. The entrance for the bees is a covered way, projecting from the hive, from six to eight inches, marked $b$ in figs. 1 and 4. The covered way by which the bees enter is surrounded on three sides by another covered way, $a$, figs. 1 and 4, leading to the air-chamber or open space $a$, figs. 1, 2, and 3, between the honey-chamber and shell of the hive. There are also three openings, $a$, against the front, where the covered way joins on to the hive, fig. 4, leading to the air-chamber $a$, figs. 1, 2, and 3. The main entrance $b$, figs. 1, 3, and 4, communicates only with the honey-chamber.

The comb-frames consist of small frames, $c$, figs. 1, 2, and 3, made of thin strips, two or three inches wide, on three sides, the bottoms joined together by narrower strips, leaving space for bees to enter. Each of the outside frames has a face or covering of wire gauze, as seen at $d$, figs. 1, 2, and 3, which, when the comb-frames are together, forms complete enclosed chambers. The lower frames, when in position, are held together by projecting screws in the sides, which press on the comb-frames in such a manner as to hold them firmly together. The comb-frames c, figs. 1 and 2, in the upper part of the hive, are held together by strips of tin tacked across each end. The upper comb-frames are similar in construction to the lower, yet entirely independent. The bees communicate with the upper comb-frames by means of holes cut through the top of the lower comb-frames.

The feeding-frame is marked e, figs. 1, 2, and 3. It is similar in size and construction to one of the lower comb-frames c, figs. 1, 2, and 3, with the addition of four strips running across it, forming troughs, covered with fine wire gauze, as shown at e, fig. 3. The troughs receive the food for the bees by means of small tubes, f, figs. 1 and 3, running from the top of the frame to each of the troughs. The gauze covering to the troughs protects the bees from being crowded into the food given them.

The feeding-apparatus is to be used only in the case of weak swarms, that are short of honey in the fall of the year; at all other times a simple comb-frame can be used instead.

What I claim as my invention, and wish to secure by Letters Patent, is—

1. The projecting entrance for the bees, surrounded by the false entrance to the air-chamber, as arranged and described.

2. The feeding-troughs, with their connecting-tubes and wire-gauze covering, as shown and described.

3. The combination of comb-frames with the wire-gauze covering, as arranged and shown.

HENRY BAUGHMAN.

Witnesses:
H. J. RICE,
G. B. OGLEVIE.